US006276519B1

(12) United States Patent
Craft et al.

(10) Patent No.: US 6,276,519 B1
(45) Date of Patent: Aug. 21, 2001

(54) RODLESS CYLINDER ROPE TENSIONING APPARATUS

(76) Inventors: Michael E. Craft, 159 Pecan La., Dubach, LA (US) 71235; Douglas M. Craft, 925 Wedgewood, Ruston, LA (US) 71270; Paul E. Mayfield, 18330 Galleria Dr., #325, Dallas, TX (US) 75252

( * ) Notice: Subject to any disclaimer, the term of this patent is extended or adjusted under 35 U.S.C. 154(b) by 0 days.

(21) Appl. No.: 09/167,126

(22) Filed: Oct. 5, 1998

Related U.S. Application Data

(63) Continuation-in-part of application No. 09/002,551, filed on Jan. 2, 1998.

(51) Int. Cl.[7] .................................................... B65G 23/44

(52) U.S. Cl. ............................................ 198/813; 198/816

(58) Field of Search ..................................... 198/813, 816

(56) References Cited

U.S. PATENT DOCUMENTS

| | | | |
|---|---|---|---|
| 1,826,103 | 10/1931 | Trempe . | |
| 2,907,450 * | 10/1959 | Reid | 198/813 |
| 3,643,497 | 2/1972 | LeCompte | 73/95.5 |
| 4,245,739 * | 1/1981 | Hartley et al. | 198/813 |
| 4,288,014 | 9/1981 | Evers | 226/44 |
| 4,545,290 * | 10/1985 | Lieberman | 92/88 |
| 5,067,608 * | 11/1991 | McLellan | 198/813 |
| 5,131,528 * | 7/1992 | Bandy, Jr. | 198/813 |
| 5,375,753 * | 12/1994 | Barthauer et al. | 226/92 |
| 5,377,892 | 1/1995 | Kimball | 226/92 |
| 5,413,264 | 5/1995 | Kotzur | 226/119 |
| 5,482,266 | 1/1996 | Takemoto | 271/272 |
| 5,503,265 * | 4/1996 | Hussar et al. | 198/813 |
| 5,660,267 * | 8/1997 | Buhman | 198/813 |
| 5,692,428 * | 12/1997 | Sonntag . | |
| 5,992,721 * | 11/1999 | Craft et al. | 226/91 |

* cited by examiner

*Primary Examiner*—Robert P. Olszewski
*Assistant Examiner*—Steven B. McAllister
(74) *Attorney, Agent, or Firm*—John M Harrison

(57) ABSTRACT

A rodless cylinder rope tensioning apparatus maintains tension in an endless rope operable for threading a web in a paper-making apparatus and includes at least one rodless cylinder having at least one yoke sheave attached to the internal piston in the rodless cylinder. The rope is initially threaded around an entry guide roller and the yoke sheave and spliced, and then stretched by operation of the rodless cylinder, which selectively causes the piston to relocate the yoke sheave along the length of the rodless cylinder and apply a selected degree of tension to the rope. In a preferred embodiment a pair of entry guide rollers is provided in a frame containing a pair of parallel rodless cylinders, each having a yoke sheave independently movable along the rodless cylinder by operation of the rodless cylinder piston, to effect tensioning of a pair of ropes in the paper-making apparatus. Various air-operated control devices are provided to effect initial threading of the rope on the entry guide roller and yoke sheave, as well as the desired "run", "paper threading" and safety operations of the rodless cylinder rope tensioning apparatus.

20 Claims, 8 Drawing Sheets

RODLESS CYLINDER ROPE TENSIONING APPARATUS

CROSS-REFERENCE TO RELATED APPLICATIONS

This application is a continuation-in-part of copending U.S. application Ser. No. 09/002,551, filed Jan. 2, 1998.

BACKGROUND OF THE INVENTION

1. Field of the Invention

This invention relates to tensioning apparatus for tensioning one or more ropes in a paper-making apparatus to facilitate threading a paper web through the paper-making apparatus. In order to locate a web of paper in proper position for processing through a paper-making apparatus, a web or sheet of paper is directed by means of one or a pair of endless ropes around multiple rolls located in the paper-making apparatus for processing the web into rolled paper. Although a single rope may be used in certain applications of the paper-making machine, it is more common to use a pair of parallel ropes, each carrying the paper web. The rope typically has a diameter of about one-half inch and is usually constructed of nylon, sisal or other natural fibers having sufficient strength to maintain a desired structural integrity as the rope or ropes traverse the multiple rollers in the paper-making apparatus. Because of the nature of operation of the paper-making apparatus and the construction of the ropes, the ropes stretch during operation, typically from about seven percent to about ten percent of their original length and each rope may be from approximately two hundred to about four hundred feet in length, thereby providing a significant problem of stretch over a period of time as the rope is used to support the paper web in the paper-making apparatus.

2. Description of the Prior Art

Various types of rope tensioning apparatus have been utilized in the prior art to stretch one or more ropes used in supporting a paper web in a paper-making apparatus and in similar equipment requiring the tensioning of ropes or cables. Typical of these patents is U.S. Pat. No. 1,826,103, dated Oct. 6, 1931, to W. J. Trempe. The Trempe automatic compensator for traveling felt in paper-making machines includes an automatic compensator which maintains relatively constant tension in a traveling felt of variable length. The automatic compensator includes a pair of tracks, a sheave having a groove in the periphery thereof guided on the tracks, a shaft upon which the sheave is rotatably mounted and a roller over which the felt is guided, the roller being mounted on the shaft. The automatic compensator is designed to automatically vary the position of the sheave to maintain substantially constant felt tension. U.S. Pat. No. 3,643,497, dated Feb. 22, 1972, to George W. Lecompte details a “Tensile Loading Apparatus For Moving Wire”. The apparatus is designed to test the tensile strength of moving wire and includes a main pulley having a pair of grooves and a free pulley biased away from the main pulley for leading wire in a loop from one main pulley groove to the other. Guides for guiding the wire to and away from the main pulley assure a 180-degree wire wrap about each main pulley groove. This wrap facilitates a high testing tension in the loop that extends about the free pulley, while only a low tension exists prior to entering on the main pulley and after leaving it. A “Dancer Roll Assembly” is detailed in U.S. Pat. No. 4,288,014, dated Sep. 8, 1981, to Jack Par Evers. The patent details a pair of dancer roll assemblies disposed in side-by-side relationship, each including an upper shaft and a lower shaft having spaced-apart sprockets which are vertically aligned. The assemblies receive a pair of belts which carry a dancer doll for vertical movement under the influence of a tensioned web passed around the dancer roll. The upper shaft is a control shaft and is connected to a pneumatic control motor which resists the rotation of the shaft and thus, the upward movement of the dancer roll. The tension on the web is controlled by controlling the air pressure in the pneumatic control motor. U.S. Pat. No. 5,375,753, dated Dec. 27, 1994, to Thomas E. Barthauer et al, details a “Tensioning Apparatus For Web Threading Endless Rope”. The rope stretcher is designed for use in a paper-making machine and includes a beam having parallel flanges forming tracks which are engaged by guide wheels supporting separate carriages. The carriages support corresponding rope sheaves for free rotation and a pair of fluid cylinders are mounted on the beam and have piston rods connected directly to the corresponding carriages. The rope sheave on each carriage has at least two peripheral grooves to receive a double loop of the rope and the frame supports a corresponding multiple groove sheave for each of the carriage sheaves and for also receiving a double loop of the rope. U.S. Pat. No. 5,377,892, dated Jan. 3, 1995, to Charles D. Kimball, discloses a fluid pressure tensioning apparatus for a web threading endless rope. The device includes a beam having a flange forming a track which is engaged by guide wheels supporting a pair of separate carriages. The carriages support corresponding rope shields for free rotation and a pair of fluid cylinders are mounted on the beam and enclose pistons connected by a corresponding piston rod directly to the corresponding carriages. Operation of the fluid cylinders is effected by a suitable fluid tension in the rope sheaves after the tensioning apparatus is installed in a paper-making machine. A serial accumulating system for filamentary material is detailed in U.S. Pat. No. 5,413,264, dated May 9, 1995, to Frank W. Kotzur et al. The winding accumulator system is designed for controlling the storage of filamentary material between a source of material and a winding receptacle and includes multiple, serially interconnected accumulator units for storing the filamentary material. The movement of the filamentary material is varied between the accumulator units and the movement varying device to limit the change in tension of the filamentary material with changes in acceleration or deceleration of the filamentary material caused by a change in the input or output of filamentary material to or from the accumulator system. U.S. Pat. No. 5,482,266, dated Jan. 9, 1996, to Takemoto et al, details a “Paper Conveying Apparatus Having A Belt Tension Adjusting Mechanism”. The belt tensioning adjusting mechanism detailed in the patent includes a belt tension adjusting pulley, over which the endless belt is placed; a plate having multiple recesses, in which a rotary shaft of the belt tensioning adjusting pulley is received; a handle having a pin provided at one end, which pin engages the recess; and a linking member connected at one end with the rotary shaft of the belt tension adjusting pulley and connected at the other end with an intermediate portion of the handle.

It is an object of this invention to provide a new and improved tensioning apparatus for tensioning one or more ropes carrying a paper web in a paper-making apparatus or machine, which tensioning apparatus utilizes one or more rodless cylinders and at least one cooperating pair of sheaves for each rodless cylinder, one of which sheaves in each cooperating pair is connected to the piston in the rodless cylinder for tensioning or reducing tension on the rope or ropes.

Another object of this invention is to provide a new and improved rodless cylinder rope tensioning apparatus for tensioning one or more ropes that carry a paper web in a paper-making apparatus, which apparatus is characterized in a preferred embodiment by at least one rodless cylinder fitted with a freely-rotating guide sheave and a tensioning sheave attached to the piston in the rodless cylinder for effecting tension on the rope threaded across the freely-rotating guide sheave and around the tensioning sheave.

Yet another object of the invention is to provide a new and improved rodless cylinder rope tensioning apparatus which is characterized in a most preferred embodiment by a pair of rodless cylinders, each fitted with a rope tensioning sheave on a corresponding piston thereof and mounted in substantially parallel relationship with a guide roller provided substantially in alignment with the rope tensioning sheave to guide the ropes over the respective guide rollers and rope tensioning sheaves and facilitate selective tensioning in each of the ropes by operation of the respective rodless cylinders.

SUMMARY OF THE INVENTION

These and other objects of the invention are provided in a new and improved rodless cylinder rope tensioning apparatus which includes at least one rodless cylinder, the internal piston of which is fitted with a rope tensioning sheave aligned with a guide sheave which freely rotates with respect to the rope tensioning sheave. The piston may be actuated in a first direction to facilitate extending a rope over the guide sheave and the rope tensioning sheave of each rodless cylinder, and the piston actuated in a second direction for tensioning the rope, responsive to operation of a preferred pneumatic control system designed for the purpose. Typical pneumatic controls include an adjustable pressure regulator with automatic water drain for receiving line or system air; left and right push-button valves for receiving air pressure from the adjustable pressure regulator; a distributor valve for controlling the flow of air into respective ends of the rodless cylinder and actuation of the piston in a selected direction responsive to operation of the left and right push button valves, respectively; an adjustable safety regulator that receives air from the adjustable pressure regulator and delivers air to the non-operating end of the rodless cylinder, to cushion the piston in the rodless cylinder should the tensioned rope inadvertently break; and a lever valve which also receives line air pressure and operates an air piloted flow valve in conjunction with an adjustable pressure regulator for additionally tensioning the rope in "paper thread" operation of the rodless cylinder.

BRIEF DESCRIPTION OF THE DRAWINGS

The invention will be better understood by reference to the accompanying drawings, wherein.

DESCRIPTION OF THE PREFERRED EMBODIMENTS

Figure 15:
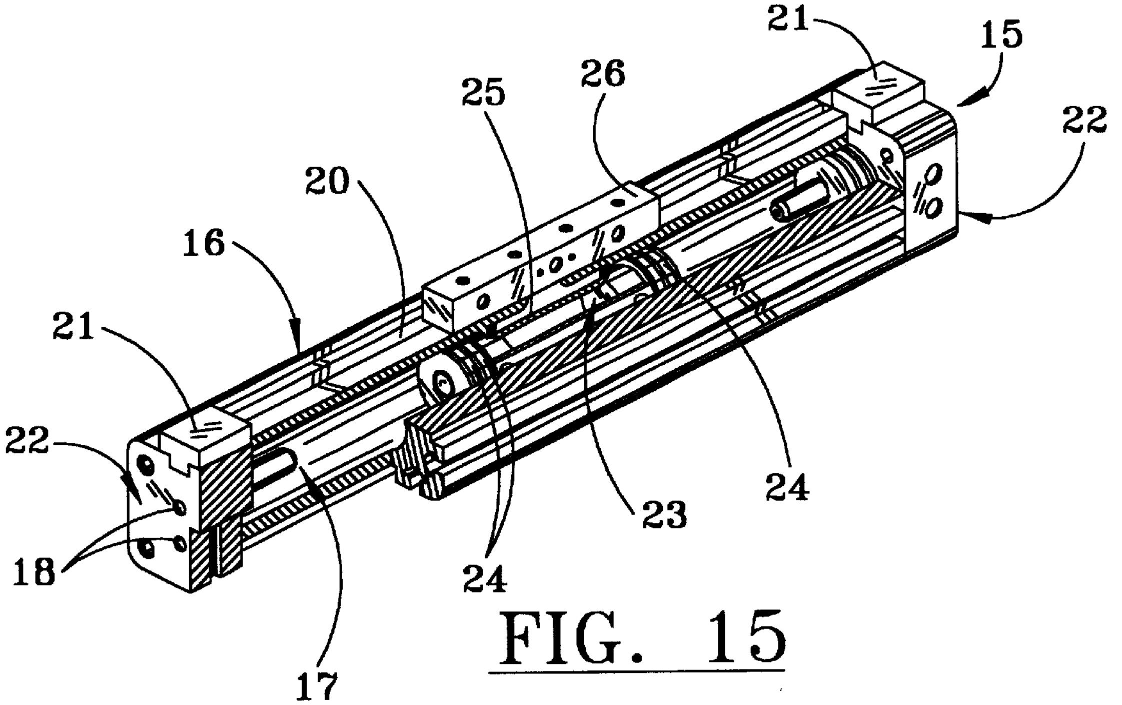
FIG. 15 is a perspective view, partially in section, of the rodless cylinder illustrated in FIG. 14, more particularly illustrating an internal piston attached to the external piston yoke of the rodless cylinder.

Referring initially to FIGS. 1–7 and 13–15 of the drawings, in a most preferred embodiment the rodless cylinder rope tensioning apparatus of this invention is generally illustrated by reference numeral 38. The rodless cylinder rope tensioning apparatus 38 is characterized in a first preferred embodiment by a rodless cylinder 15, having an elongated barrel 16 with a barrel bore 17, as illustrated in FIG. 15. Air supply ports 18 are provided in each of the end caps 22 of the barrel 16 and communicate with the barrel bore 17, as further illustrated in FIGS. 13 and 15. A barrel slot 20 is provided longitudinally in the barrel 16 and communicates with the barrel bore 17 for slidably receiving a piston yoke 26, which is attached to an internal piston 23, positioned in the barrel bore 17 by means of a connecting plate 25, as further illustrated in FIG. 15. Piston seals 24 are fitted to the ends of the piston 23 for sealing the piston 23 in slidable relationship inside the barrel bore 17 of the barrel 16 and the end caps 22 close each end of the barrel 16, as further illustrated in FIG. 14. Referring again to FIG. 15, a pair of end cushions 21 are also typically provided in the barrel bore 17 at each end of the barrel 16 to cushion movement of the piston 23 inside the barrel bore 17 with an accompanying sliding movement of the external piston yoke 26, as hereinafter further described.

Figure 1:
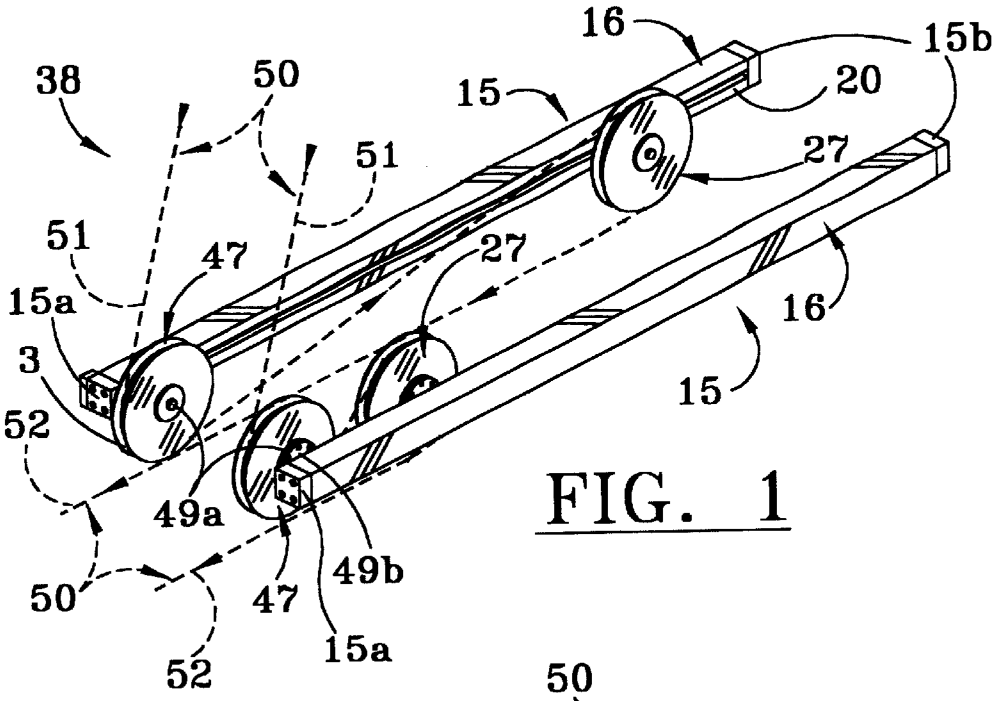
FIG. 1 is a perspective view of a first preferred embodiment of the rodless cylinder rope tensioning apparatus, horizontally mounted and including a pair of rodless cylinders, cooperating sliding yoke sheaves and companion entry guide rollers for use in a paper-making apparatus and tensioning one or more ropes in the apparatus.
Figure 2:
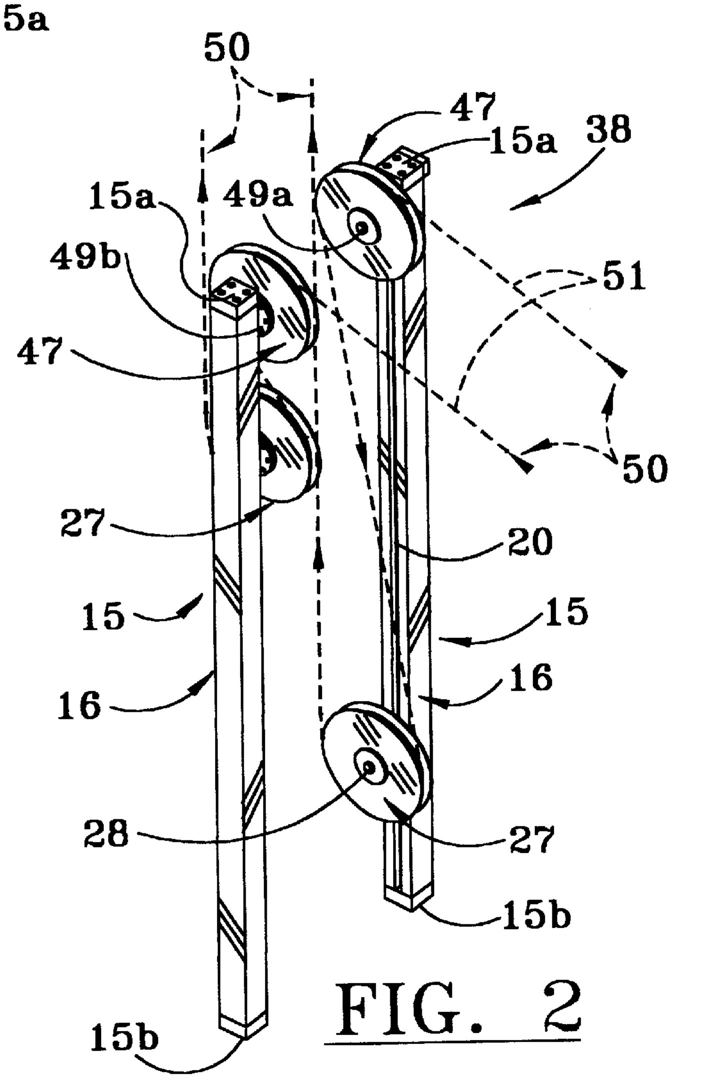
FIG. 2 is a perspective view of the rodless cylinder rope tensioning apparatus illustrated in FIG. 1, with the rodless cylinders oriented vertically.

As further illustrated in FIGS. 1, 2 and 8–10, it will be appreciated by those skilled in the art that one or more of the rodless cylinders 15, which are the primary operating components of the rodless cylinder rope tensioning apparatus 38, may be horizontally (FIG. 1) or vertically (FIG. 2) oriented, to receive one or more ropes 50, (illustrated in phantom) which are conventionally used in a paper-making machine (not illustrated) to carry a paper web (also not illustrated) in the paper-making process. Accordingly, at least one entry guide roller 47 is typically attached to corresponding rodless cylinder 15 by means of a roller shaft 49*a* and shaft bracket 49*b* to receive the respective rope(s) 50. Furthermore, a yoke sheave 27 is mounted on a corresponding sheave shaft 28, illustrated in FIGS. 8–10 and the sheave shaft bearing 29 carrying the sheave shaft 28 is fitted with a yoke slot 30, for engaging and mounting on the corresponding piston yoke 26, (FIGS. 11, 12, 14 and 15) which is slidably mounted on the rodless cylinder 15 as heretofore described. Each of the yoke sheaves 27 can therefore slide with the corresponding piston yoke 26 along the length of the rodless cylinder 15 at the barrel slot 20, for purposes which will be hereinafter described. Furthermore, the entry rope segment 51 of the rope or ropes 50 extends around the entry guide roller or rollers 47 as heretofore described and extend 180 degrees around the corresponding yoke sheave 27, to exit the rodless cylinder rope tensioning apparatus 38 as an exit rope segment 52, as further illustrated in FIGS. 1 and 2. It will be appreciated by those skilled in the art that under circumstances where a single rope 50 is utilized in the specific paper-making apparatus in question, a single rodless cylinder 15, with an accompanying entry guide roller 47 and a corresponding slidably-mounted yoke sheave 27 may be utilized to tension the rope 50, in either the horizontal configuration illustrated in FIG. 1 or the vertical position illustrated in FIG. 2. Alternatively, under circumstances where a pair of ropes 50 is utilized in the paper-making apparatus the ropes 50 may be threaded as indicated in FIGS. 1 and 2 around the respective pairs of entry guide rollers 47 and corresponding yoke sheaves 27 for tensioning purposes, as hereinafter further described.

Figure 4:
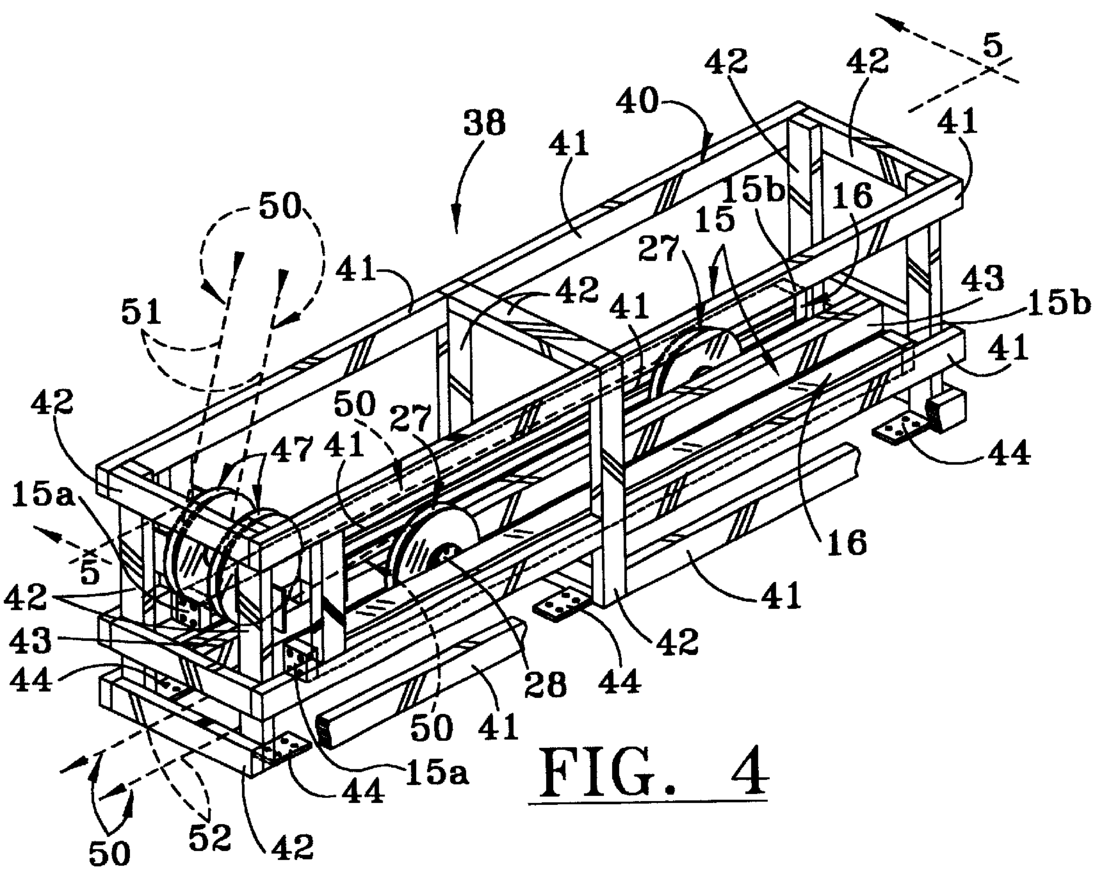
FIG. 4 is a perspective view of a preferred embodiment of the rodless cylinder rope tensioning apparatus illustrated in FIGS. 1 and 2, more particularly illustrating a frame for receiving and mounting each of the rodless cylinders, as well as the entry guide rollers.
Figure 5:
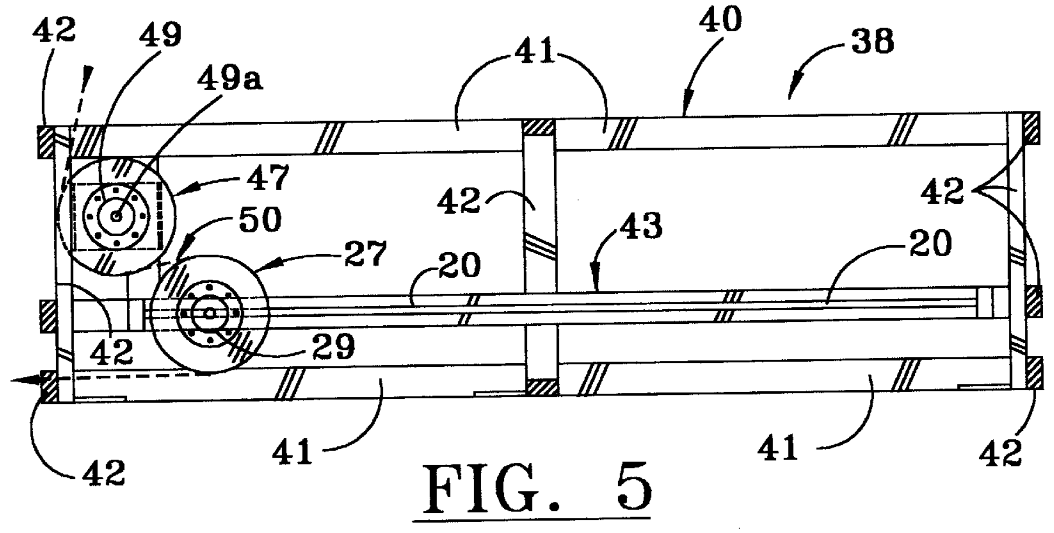
FIG. 5 is a sectional view taken along line 5—5 of the rodless cylinder rope tensioning apparatus illustrated in FIG. 4.
Figure 6:
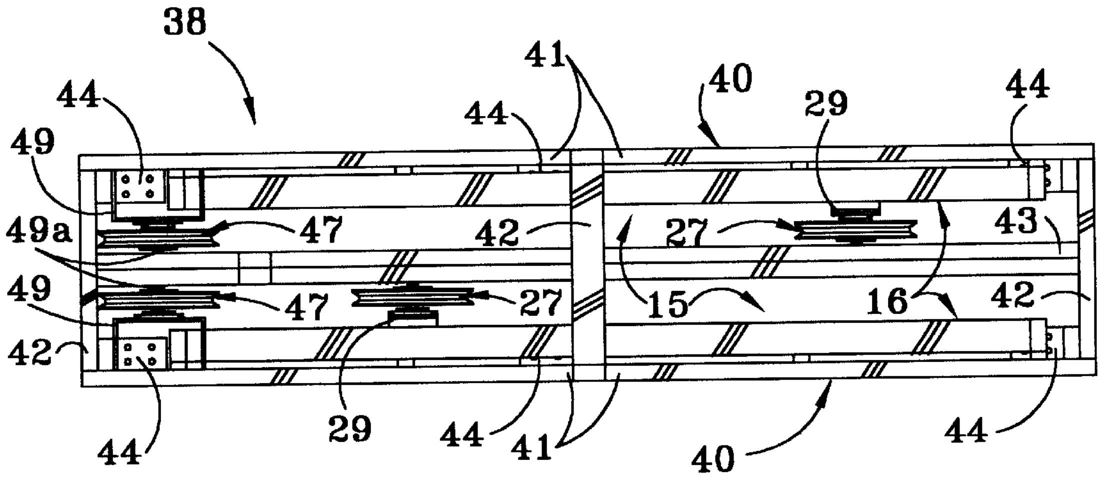
FIG. 6 is a bottom view of the rodless cylinder rope tensioning apparatus illustrated in FIG. 4.
Figure 7:
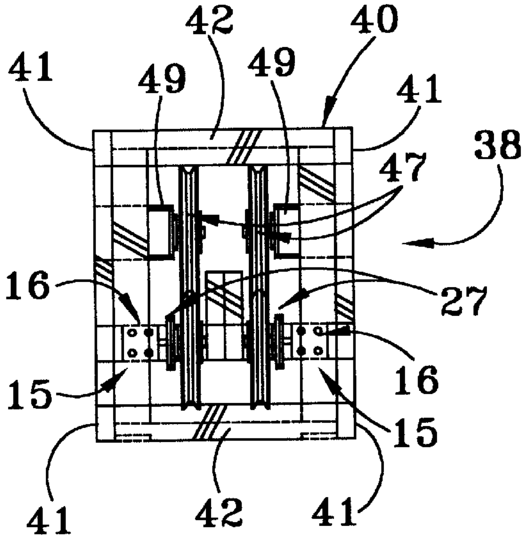
FIG. 7 is an end view of the rodless cylinder rope tensioning apparatus illustrated in FIGS. 4–6.
Figure 8:
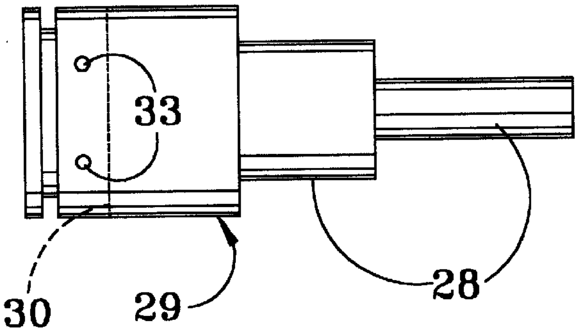
FIG. 8 is a side view of a typical sheave shaft bearing for mounting on the piston yoke of a rodless cylinder and receiving a yoke sheave.
Figure 9:
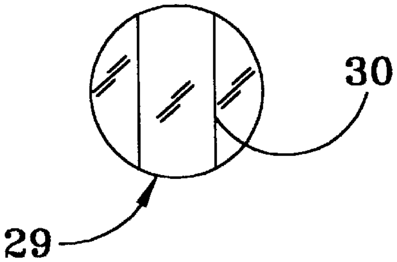
FIG. 9 is a bearing end view of the sheave shaft bearing illustrated in FIG. 8.
Figure 10:
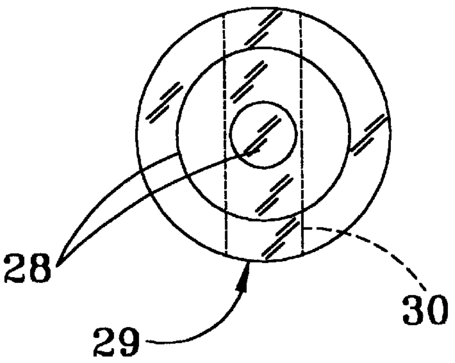
FIG. 10 is a shaft end view of the sheave shaft bearing illustrated in FIG. 8.
Figure 11:
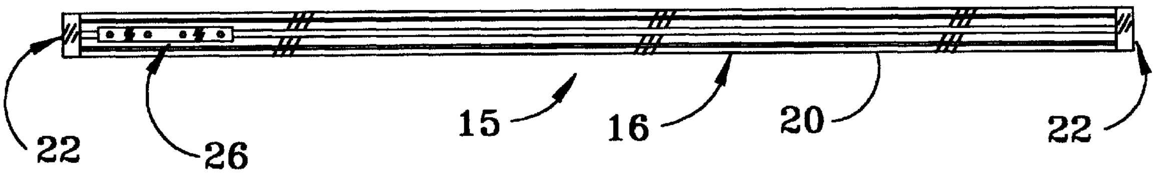
FIG. 11 is a top view of a typical rodless cylinder fitted with a piston yoke for receiving the sheave shaft bearing illustrated in FIG. 8 and the yoke sheave illustrated in FIG. 3.
Figure 12:
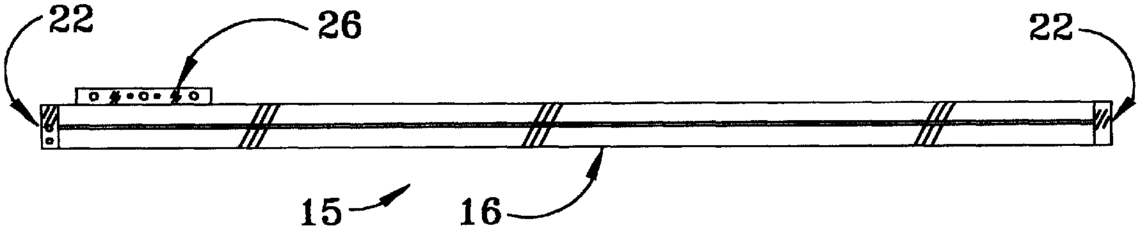
FIG. 12 is a side view of the rodless cylinder illustrated in FIG. 11.
Figure 13:
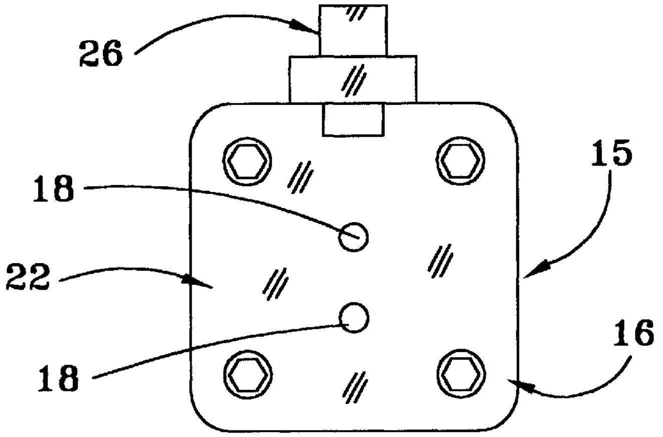
FIG. 13 is an end view of the rodless cylinder illustrated in FIGS. 11 and 12.
Figure 14:
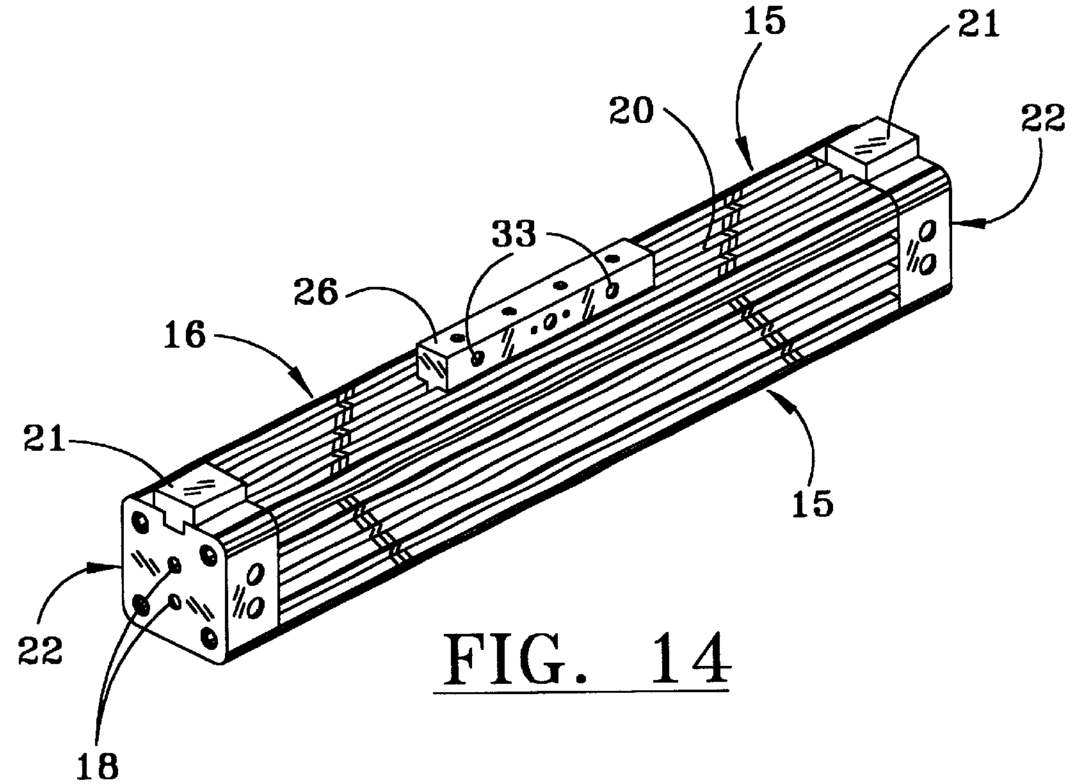
FIG. 14 is a perspective view of the rodless cylinder illustrated in FIGS. 11–13.

Referring now to FIGS. 4–7 of the drawings, in a most preferred embodiment of the invention the respective rodless cylinders 15 are typically installed and mounted in a frame 40, constructed of longitudinal frame members 41, cross frame members 42 and a central longitudinal stiffener 43. Mount brackets 44 are also provided on the frame 40 for mounting the frame 40 in a vertical or horizontal position in the rope tensioning apparatus, as deemed necessary. Furthermore, roller bearings 49 may be provided on the frame 40 for receiving respective entry guide rollers 47 under circumstances where the entry guide rollers 47 are mounted to the frame 40 and not to the respective rodless cylinders 15, as illustrated in FIGS. 1 and 2. The rodless cylinder rope tensioning apparatus 38 illustrated in FIG. 4 thus operates in the same manner as the corresponding rodless cylinder rope tensioning apparatus 38 illustrated in FIGS. 1 and 2, either in horizontal or vertical position, wherein the respective ropes 50 are extended through the entry guide rollers 47 as entry rope segments 51 and project from the corresponding yoke sheaves 27, becoming exit rope segments 52, as illustrated in FIG. 4.

Figure 3:
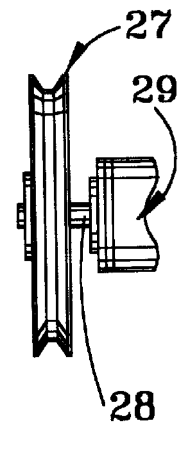
FIG. 3 is a side view of a typical sliding yoke sheave, more particularly illustrating rotatable mounting of the yoke sheave on a sheave shaft in a sheave shaft bearing.

Referring again to FIGS. 3 and 8–10 in a most preferred embodiment of the invention the respective yoke sheaves 27 are mounted on the corresponding piston yokes 26 of the rodless cylinders 15 by means of the respective stepped sheave shafts 28, which are journalled for rotation in the sheave shaft bearings 29. In this installation, the yoke slot 30 of each of the sheave shaft bearings 29 is fitted over the corresponding piston yoke 26, which is slidably mounted on each rodless cylinder 15, and fasteners such as bolts (not illustrated) are extended through the matching bolt openings 33 and 33*a*, provided in the sheave shaft bearings 29 and the piston yoke 26, respectively, to receive corresponding bolts (not illustrated) in the installations. Each of the yoke sheaves 27 is typically shaped as illustrated in FIG. 3 to accommodate the rope 50.

Figure 17:
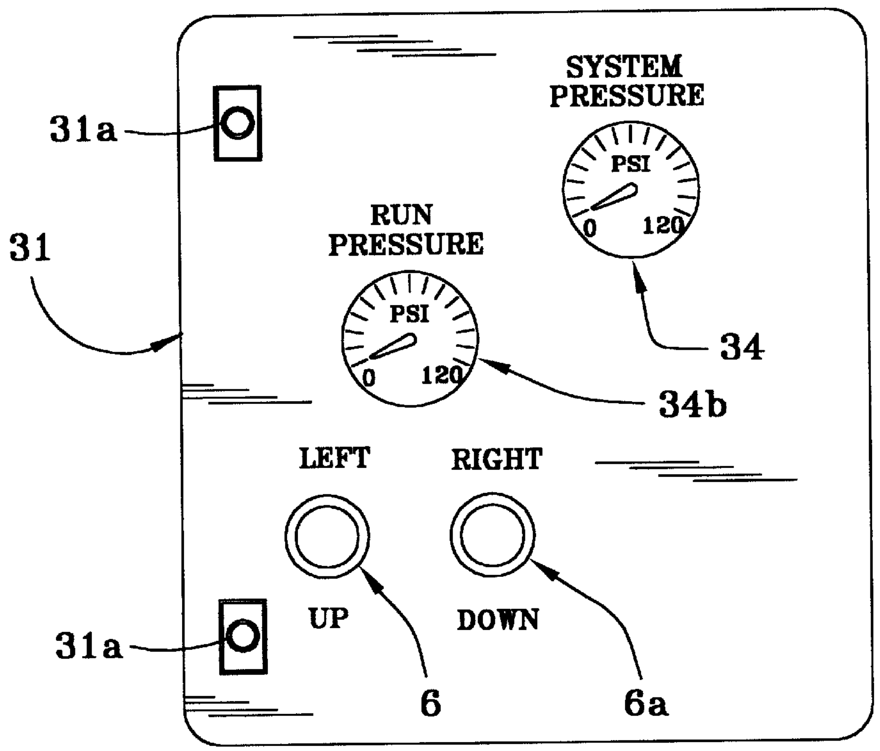
FIG. 17 is a front view of the control cabinet illustrated in FIG. 16.
Figure 16:
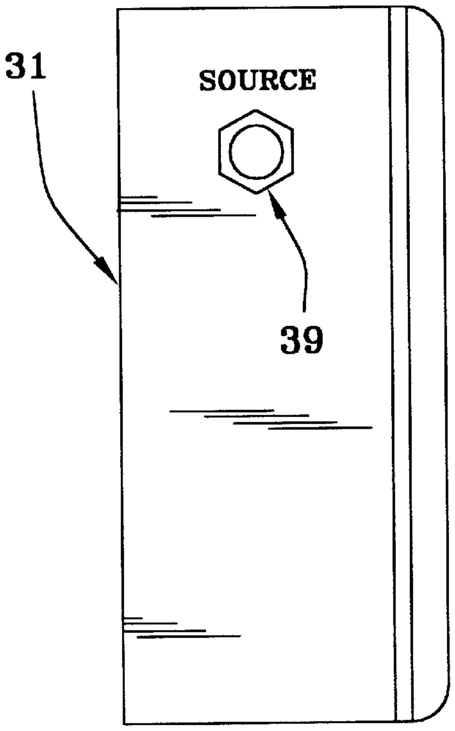
FIG. 16 illustrates a right side view of a typical control cabinet housing controls used to operate the rodless cylinder rope tensioning apparatus of this invention.
Figure 18:
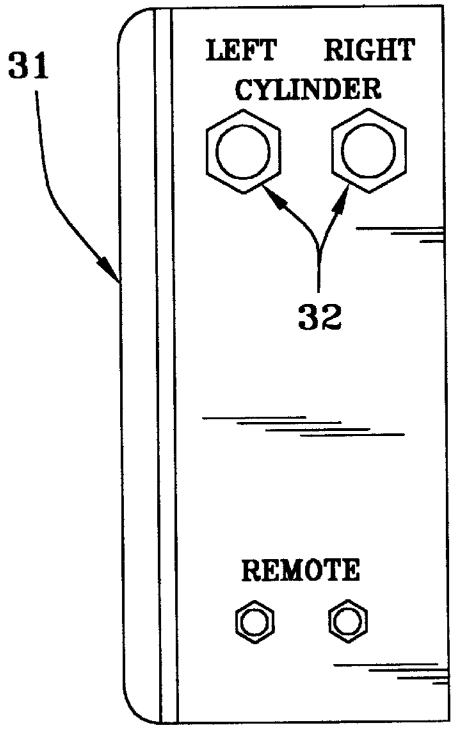
FIG. 18 is a left side view of the control cabinet illustrated in FIGS. 16 and 17.
Figure 19:
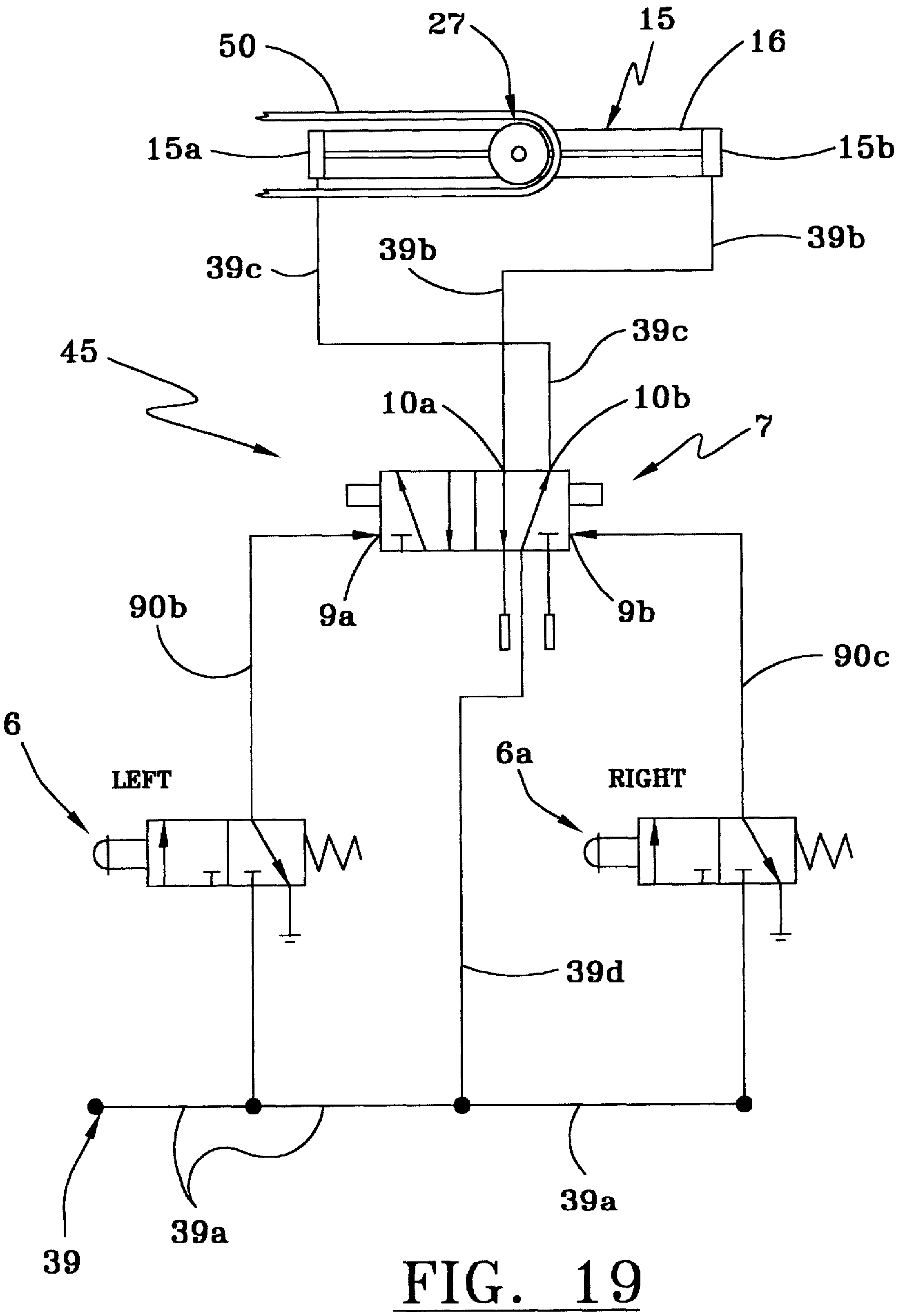
FIG. 19 is pneumatic schematic illustrating preferred components for operating the rodless cylinder rope tensioning apparatus under a simplified embodiment of the invention.
Figure 20:
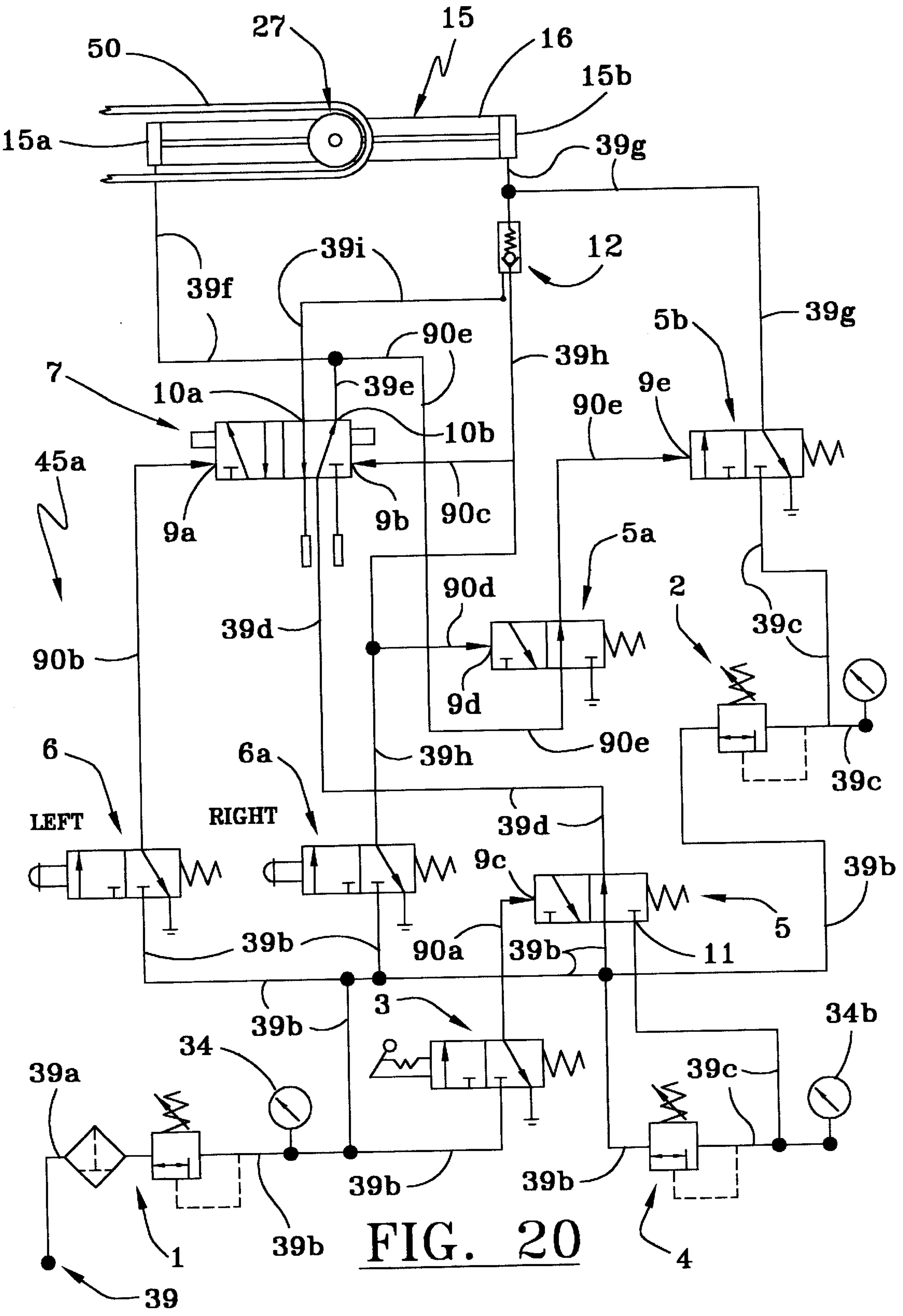
FIG. 20 is a pneumatic schematic illustrating operating components for operating the rodless cylinder rope tensioning apparatus of this invention in a most preferred embodiment.

Referring now to FIGS. 16–20 of the drawings, the rodless cylinder rope tensioning apparatus 38 is operated by means of pneumatic control systems 45 and 45*a* which are illustrated schematically in FIGS. 19 and 20, respectively. In the control system embodiment illustrated in FIG. 19, an air source 39 is pneumatically connected by means of an air flow line 39*a*, to a left two-position, two-way push button valve 6, which is pneumatically connected to a two-position, five-way, double air piloted distributor valve 7, at a pressure port 9*a*, by means of an air signal line 90*b*. A right two-position, two-way push button valve 6*a* is also connected to the air source 39 by means of an air flow line 39*a* and to the distributor valve 7 at a pressure port 9*b*, by means of an air signal line 90*c*. The air source 39 is also directly pneumatically coupled to the distributor valve 7 by means of an air flow line 39*d*. The distributor valve 7 is, in turn, pneumatically connected to the operating end 15*a* of a rodless cylinder 15 by means of an air flow line 39*c*, and to the non-operating end 15*b* of the rodless cylinder 15, by means of an air flow line 39*b*, both at the air supply ports 18, illustrated in FIGS. 13 and 14. The left push button valve 6 is designed to facilitate threading of the rope 50 onto the entry guide roller 47 and the yoke sheave 27, while the right push button valve 6*a* is designed to facilitate tensioning of the rope 50 on the entry guide roller 47 and the yoke sheave 27. As illustrated in FIG. 17, the appropriate controls for the left and right push button valves 6 and 6*a*, respectively, may be mounted in a control cabinet 31, having air line couplings 32 as illustrated in FIG. 18 for coupling to the air lines 39*a* and typically including a cabinet lock 31*a*, as illustrated in FIG. 17. A pressure gauge 34 may also be provided in the control cabinet 31 to indicate the pressure of the air source 39.

In operation, and referring again to FIG. 19 of the drawings, the rodless cylinder 15 is operated to move the yoke sheave 27 linearly along the barrel 16 and thread and tension the rope 50, as follows. For brevity, operation of the pneumatic control system 45 illustrated in FIG. 19 will be described with respect to a single rodless cylinder 15 and rope 50. Initially, referring again to FIGS. 1, 4 and 19, the left push button valve 6 is pressed to slidably adjust the yoke sheave 27 toward the operating end 15*a* of the rodless cylinder 15 that will allow for maximum stroke, which will be to the left, nearest the entry guide roller 47, as illustrated in FIGS. 1 and 4. Actuation of the left push button valve 6 facilitates flow of air from the air source 39 through the air flow line 39*a*, the left push button valve 6 and air signal line 90*b*, generating an air pressure signal at the pressure port 9*a*, which opens an air flow port 10*a* in the distributor valve 7.

Consequently, air flows from the distributor valve 7 through the air flow port 10*a*, into the non-operating end 15*b* of the rodless cylinder 15 through the air flow line 39*b*. As a result, the pressurized air pushes the piston 23 inside the rodless cylinder 15, and the attached yoke sheave 27 toward the operating end 15*a* of the rodless cylinder 15, until the left push button valve 6 is released. At that time, the air pressure signal at the pressure port 9*a* on the distributor valve 7 is terminated and the air flow port 10*a* closes, preventing further flow of air into the rodless cylinder 15 from the air source 39 and halting travel of the yoke sheave 27. The rope 50 is threaded around the entry guide roller 47 and 180 degrees onto the yoke sheave 27 and then spliced to define a continuous loop, in conventional fashion. The right push button valve 6*a* is then manipulated, causing the yoke sheave 27 to move in the opposite direction to tension the rope 50, until the excess slack is removed from the rope 50. Actuation of the right push button valve 6*a* facilitates flow of air from the air source 39 and air flow line 39*a*, through the right push button valve 6*a* and air signal line 90*c*, generating an air pressure signal at the pressure port 9*b*, which opens an air flow port 10*b* in the distributor valve 7. Consequently, air flows from the distributor valve 7 through the air flow port 10*b*, and into the operating end 15*a* of the rodless cylinder 15 through the air flow line 39*c*. The resulting air pressure exerted on the piston 23 relocates the yoke sheave 27 toward the right on the rodless cylinder 15, thereby exerting tension on the rope 50. The right push button valve 6*a* remains in this "run" mode during running of the rope 50 through the paper-making machine (not illustrated) and the yoke sheave 27, as well as the corresponding entry guide roller 47 in the apparatus.

Referring now to FIGS. 17 and 20 of the drawings, the illustrated alternative pneumatic control system 45*a* is designed to include additional equipment for augmenting tension on the rope 50, as well as a safety feature for protecting the rodless cylinder 15 during operation of the rodless cylinder rope tensioning apparatus 38. Accordingly, the pneumatic control system 45*a* illustrated in the schematic of FIG. 20 includes an adjustable pressure regulator with automatic water drain 1, which is pneumatically coupled to the air source 39 by means of an air flow line 39*a*. The adjustable pressure regulator with automatic water drain 1 further includes a pressure gauge 34, typically mounted in the control cabinet 31 (FIG. 17), a water sump (not illustrated) and a sump drain (also not illustrated), for removing water from the air applied to the adjustable pressure regulator with automatic water drain 1 from the air source 39. The left push button valve 6, which facilitates initial threading of a rope 50 on the entry guide roller 47 and yoke sheave 27 of the rodless cylinder 15 as heretofore described with respect to FIG. 19, is pneumatically coupled to the adjustable pressure regulator with automatic water drain 1 by means of air flow lines 39*b*, as well as to the distributor valve 7 at a pressure port 9*a*, by means of an air signal line 90*b*. The distributor valve 7 is, in turn, pneumatically connected by means of air flow lines 39*e* and 39*f* at an air flow port 10*b*, to the operating end 15*a* of the rodless cylinder 15 for controlling flow of air under pressure from the adjustable pressure regulator with automatic water drain 1, into the rodless cylinder 15, as further heretofore described. The distributor valve 7 is also pneumatically coupled by means of air flow lines 39*i* and 39*g* at an air flow port 10*a*, to the non-operating end 15*b* of the rodless cylinder 15 through an air piloted check valve 12. The right push button valve 6*a*, which facilitates tensioning of the rope 50, is pneumatically connected to the adjustable pressure regulator with automatic water drain 1 by means of air flow lines 39*b*, and an air flow line 39*h*, extending from pneumatic communication with the right push button valve 6*a*, terminates at the air piloted check valve 12. An air signal line 90*c* is pneumatically coupled to the air flow line 39*h* and terminates in pneumatic communication with the distributor valve 7 at a pressure port 9*b*, for purposes hereinafter further described. A two-position, three-way lever valve 3, which controls "run" and "paper thread" system operation, is also pneumatically coupled by means of air flow lines 39*b* to the adjustable pressure regulator with automatic water drain 1 and by means of an air signal line 90*a*, to a two-position, three-way air piloted flow valve 5 at a pressure port 9*c*. An adjustable pressure regulator 4 which regulates the "paper thread" air pressure in the system, is pneumatically connected to the adjustable pressure regulator with automatic water drain 1 by means of air flow lines 39*b*, and to the flow valve 5 by means of an air flow line 39*c*, at an air entry port 11. The flow valve 5 is also connected to the adjustable pressure regulator with automatic water drain 1 by means of air flow lines 39*b*, and to the distributor valve 7 by means of an air flow line 39*d*. The flow valve 5 serves to direct air from the adjustable pressure regulator with automatic water drain 1 to the operating end 15*a* of the rodless cylinder 15, by operation of the right push button valve 6*a*, as hereinafter further described. The flow valve 5 also directs air from the adjustable pressure regulator 4 to the operating end 15*a* of the rodless cylinder 15 by operation of the lever valve 3, to augment the air pressure entering the operating end 15*a* of the rodless cylinder 15 and further tension the rope 50 in "paper thread" operation, as hereinafter further described. An adjustable safety regulator 2 is pneumatically coupled to the adjustable pressure regulator with automatic water drain 1 by means of air flow lines 39*b*, and to a two-position, three-way air piloted safety valve 5*b* by means of an air flow line 39*c*. An air flow line 39*g* pneumatically connects the safety valve 5*b* to the non-operating end 15*b* of the rodless cylinder 15. The adjustable safety regulator 2 is designed to maintain air pressure in the "dead" or non-operating side of the rodless cylinder 15 during "paper thread" and "run" operations of the rodless cylinder 15. The air piloted check valve 12 is provided in the air flow line 39*i* to prevent backflow of air from the rodless cylinder 15 or adjustable safety regulator 2 to the distributor valve 7. A two-position, three-way, air piloted actuation valve 5*a* is pneumatically connected to the distributor valve 7 by means of the air flow line 39*e* and an air signal line 90*e*, and to the safety valve 5*b* at a pressure port 9*e*, by means of the air signal line 90*e*. The actuation valve 5*a* is further pneumatically connected to the air flow line 39*h*, by means of an air signal line 90*d*. The actuation valve 5*a* facilitates opening of the safety valve 5*b* during operation of the right push button valve 6*a*, and flow of air under pressure from the adjustable safety regulator 2 to the non-operating end 15*b* of the rodless cylinder 15, in the "running" and "paper threading" operations of the rodless cylinder 15, as hereinafter further described.

Accordingly, referring again to FIG. 20 of the drawings, in operation, the yoke sheave 27 is initially slidably adjusted on the rodless cylinder 15 toward the non-operating end 15*a* thereof, to the point of minimum rope stretch, as heretofore described with respect to the pneumatic control system 45 illustrated in FIG. 19. The left push button valve 6 is utilized for this purpose and, when activated, air under pressure set by the adjustable pressure regulator with automatic water drain 1, flows through air flow lines 39*b*, the left push button valve 6 and air signal line 90*b*, to generate an air pressure signal at the pressure port 9*a* on the distributor valve 7. The air pressure signal opens the air flow port 10*a* in the distributor valve 7, which now allows a flow of air under pressure set by the adjustable pressure regulator with automatic water drain 1, through air flow lines 39*b*, the flow valve 5, the air flow line 39*d*, air flow port 10*a* of the distributor valve 7, air flow line 39*i*, air piloted check valve 12, air flow line 39*g* and finally, into the non-operating end 15*b* of the rodless cylinder 15. The pressurized. air pushes the internal piston 23 and attached yoke sheave 27 toward the operating end 15*a* of the rodless cylinder 15, until the left push button valve 6 is released. At that time the left push button valve 6 closes and causes the air flow port 10*a* in the distributor valve 7 to close, by terminating the air pressure signal at the pressure port 9*a*. As a result, the flow of air into the non-operating end 15*b* of the rodless cylinder 15 is terminated, halting leftward travel of the yoke sheave 27 on the rodless cylinder 15. The rope 50 is then extended through the entry guide roller 47 and 180 degrees around the yoke sheave 27 and spliced, taking out maximum slack in the splicing operation. After splicing is completed and the rope 50 is in the proper position in the paper-making machine (not illustrated) and in the rodless cylinder rope tensioning apparatus 38, the right push button valve 6*a* is pressed to locate the yoke sheave 27 toward the right on the rodless cylinder 15 and remove the balance of the slack in the rope 50, as heretofore described with respect to FIG. 19. This action maintains tension on the rope 50 during the "run" operation of the rodless cylinder 15. After activation of the right push button valve 6*a*, air under pressure from the adjustable pressure regulator with automatic water drain 1 flows through air flow lines 39*b* and the opened, right push button valve 6*a*, the air flow line 39*h*, and the air signal line 90*c* to generate an air pressure signal at the pressure port 9*b*, which opens the air flow port 10*b* in the distributor valve 7. Air then flows under pressure set by the adjustable pressure regulator with automatic water drain 1, through air flow lines 39*b*, flow valve 5, air flow line 39*d*, air flow port 10*b* in the distributor valve 7, the air flow lines 39*e* and 39*f* and finally, into the operating end 15*a* of the rodless cylinder 15, to locate the internal piston 23 and yoke sheave 27 toward the non-operating end 15*b* of the rodless cylinder 15. Although the rope 50 is now in the "run" configuration, additional tension must normally be exerted on the rope 50 in order to begin threading the paper web (not illustrated) through the paper machine on the rope 50. Accordingly, the right push button valve 6*a* remains activated and the lever valve 3 is manipulated from the "run" position to the "paper thread" position to increase the rope tension. Air under pressure from the adjustable pressure regulator with automatic water drain 1 then flows through the opened lever valve 3 and air signal line 90*a*, and the resulting air pressure signal at the pressure port 9*c* on the flow valve 5 opens the air entry port 11 in the flow valve 5, which action facilitates a flow of air under pressure set by the adjustable pressure regulator 4, through the air flow line 39*c* and into the flow valve 5. There, air under pressure from the adjustable pressure regulator 4 joins air under pressure from the adjustable pressure regulator 1 and the combined air pressure flows through the air flow line 39*d* and air flow port 10*b* in the distributor valve 7, and into the operating end 15*a* of the rodless cylinder 15 through air flow lines 39*e* and 39*f*. The combined pressure of the air from the two regulators are thus additive in the flow valve 5, resulting in an increased air pressure at the operational end 15*a* of the rodless cylinder 15, to facilitate a tighter stretching or tensioning of the rope 50 than is achieved by the air flowing from the adjustable pressure regulator with automatic water drain 1, alone. Accordingly, the rope 50 is now operating at maximum tension in the "paper thread" operation to facilitate loading of a paper web (not illustrated) on the rope 50 and threading the paper web through the paper machine (not illustrated) in conventional fashion.

Referring again to FIG. 20 of the drawings, it will be appreciated by those skilled in the art that the adjustable safety regulator 2 is designed to protect the rodless cylinder 15 and other components of the system from inadvertent damage should the rope 50 suddenly break. During the "running" and "paper threading" operations of the rodless cylinder 15 by operation of the right push button valve 6*a* or operation of both that valve and the lever valve 3, respectively, the yoke sheave 27 is slidably relocated from the left to the right on the rodless cylinder 15, as described above, thereby exerting tension on the rope 50. Simultaneously, air under pressure set by the adjustable pressure regulator with automatic water drain 1, flows from the right push button valve 6*a* and air flow line 39*h*, as heretofore described, and then through the air signal line 90*d*, generating an air pressure signal at the pressure port 9*d*, which signal opens the normally closed actuation valve 5*a*. Because the air signal line 90*c*, by operation of the right push button valve 6*a*, generates an air signal at the pressure port 9*b* which opens the air flow port 10*b* in the distributor valve 7, to allow flow of air into the operating end 15*a* of the rodless cylinder 15, as heretofore described, air also flows from the distributor valve 7 through the air signal line 90*e* and the now open actuation valve 5*a*, thus generating an air pressure signal at the pressure port 9*e*, which signal opens the normally closed safety valve 5*b*. Consequently, air under pressure from the adjustable safety regulator 2 flows through the air flow line 39*c*, safety valve 5*b*, air flow line 39*g* and into the non-operating end 15*b* of the rodless cylinder 15. The resulting air pressure maintained in the "dead" side of the rodless cylinder 15 serves to cushion the piston 23 in the rodless cylinder 15 and prevent the piston 23 from slamming into the non-operating end 15*b* of the rodless cylinder 15, due to the tension exerted by the rope 50, should the rope 50 inadvertently break.

It will be appreciated by those skilled in the art that the above explanation of the operation of the pneumatic control system 45 is directed to the single rope 50 threaded through a single entry guide roller 47 and corresponding yoke sheave 27. However, in many operations, two such rodless cylinder rope tensioning apparatus 38 will be necessary, thus necessitating a second pneumatic control system 45 which is identical to the pneumatic control system 45 illustrated in FIG. 17. Hence, referring to FIG. 16, a pair of left push button valves 6 and a pair of right push button valves 6*a* would be utilized for that purpose and all of the other components illustrated in FIG. 18 would be duplicated, with the exception of the adjustable pressure regulator with automatic water drain 1.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A rodless cylinder rope tensioning apparatus comprising at least one rodless cylinder each comprising a barrel; a piston slidably disposed in said barrel; a distributor valve pneumatically connected to said barrel; a flow valve pneumatically connected to said distributor valve; a first pressure regulator pneumatically connected to said flow valve; a first valve operably connected to said distributor valve and said first pressure regulator for selectively opening said distributor valve and facilitating flow of air from said first pressure regulator through said flow valve and said distributor valve and into said barrel and causing said piston to traverse said barrel in a first direction; a second valve operably connected to said distributor valve and said first pressure regulator for selectively opening said distributor valve and facilitating flow of air from said first pressure regulator, through said flow valve and said distributor valve and into said barrel and causing said piston to traverse said barrel in a second direction; and a yoke sheave connected to said piston for receiving the rope by operation of said first valve and adjusting the tension on the rope responsive to operation of said second valve.

2. The rodless cylinder rope tensioning apparatus of claim 1 wherein said at least one rodless cylinder comprises a pair of rodless cylinders.

3. The rodless cylinder rope tensioning apparatus of claim 1 comprising at least one guide roller provided in substantial alignment with said yoke sheave for receiving the rope and aligning the rope with said yoke sheave.

4. The rodless cylinder rope tensioning apparatus of claim 2 comprising a frame for receiving said rodless cylinders in substantially parallel, spaced-apart relationship with respect to each other.

5. The rodless cylinder rope tensioning apparatus of claim 1 comprising a safety mechanism operably connected to said barrel and said second valve for applying air pressure against movement of said internal piston in said second direction, responsive to operation of said second valve.

6. The rodless cylinder rope tensioning apparatus of claim 1 comprising:

(a) at least one guide roller provided in substantial alignment with said yoke sheave for receiving the rope and aligning the rope with said yoke sheave; and (b) a safety mechanism operably connected to said rodless cylinder and said second valve for applying air pressure against movement of said piston in said second direction, responsive to operation of said second valve.

7. The rodless cylinder rope tensioning apparatus of claim 6 wherein said at least one rodless cylinder comprises a pair of rodless cylinders.

8. The rodless cylinder rope tensioning apparatus of claim 7 comprising a frame for receiving said rodless cylinders in substantially parallel, spaced-apart relationship with respect to each other.

9. A rodless cylinder rope tensioning apparatus for tensioning at least one rope in a paper-making machine, said apparatus comprising at least one rodless cylinder each having a barrel including an internal bore, an operating end and a non-operating end; a piston slidably disposed in said internal bore between said operating end and said non-operating end of said barrel; a yoke sheave rotatably carried by said piston, said yoke sheave slidably disposed with said piston; a distributor valve pneumatically connected to said operating end and said non-operating end of said barrel; a flow valve pneumatically connected to said distributor valve; a first pressure regulator pneumatically connected to said flow valve; a first valve pneumatically connected to said distributor valve and said first pressure regulator for selectively opening said distributor valve and facilitating flow of air from said first pressure regulator through said flow valve and said distributor valve and into said non-operating end of said barrel; and a second valve pneumatically connected to said distributor valve and said first pressure regulator for selectively opening said distributor valve and facilitating flow of air from said first pressure regulator, through said flow valve and said distributor valve and into said operating end of said barrel, whereby said piston is caused to selectively traverse said internal bore of said barrel in a first direction for threading the rope on said yoke sheave responsive to operation of said first valve and said piston is caused to selectively traverse said internal bore of said barrel in a second direction for selectively tensioning the rope responsive to operation of said second valve.

10. The rodless cylinder rope tensioning apparatus of claim 9 comprising a third valve operably connected to said bore on said one end of said barrel, for selectively tensioning said yoke sheave in low pressure and high pressure operating modes of said piston in said second direction.

11. The rodless cylinder rope tensioning apparatus of claim 9 comprising a safety mechanism operably connected to said second valve and said internal bore at said other end of said barrel for applying air pressure against movement of said piston in said second direction, responsive to operation of said second valve.

12. The rodless cylinder rope tensioning apparatus of claim 9 comprising:

(a) a third valve operably connected to said internal bore on said one end of said barrel, for selectively tensioning said yoke sheave in low pressure and high pressure operating modes on said piston in said second direction; and (b) a safety mechanism operably connected to said second valve and said internal bore at said other end of said barrel for applying air pressure against movement of said piston in said second direction, responsive to operation of said second valve.

13. The rodless cylinder rope tensioning apparatus of claim 9 comprising at least one guide roller provided in substantial alignment with said yoke sheave for receiving the rope and aligning the rope with said yoke sheave.

14. The rodless cylinder rope tensioning apparatus of claim 13 comprising a third valve operably connected to said internal bore on said one end of said barrel, for selectively tensioning said yoke sheave in low pressure and high pressure operating modes on said piston in said second direction.

15. The rodless cylinder rope tensioning apparatus of claim 13 comprising a safety mechanism operably connected to said second valve and said internal bore at said other end of said rodless cylinder for applying air pressure against movement of said piston in said second direction, responsive to operation of said second valve.

16. The rodless cylinder rope tensioning apparatus of claim 13 comprising:

(a) a third valve operably connected with said internal bore on said one end of said barrel, for selectively tensioning said yoke sheave in low pressure and high pressure operating modes on said piston in said second direction; and (b) a safety mechanism operably connected to said second valve and said internal bore at said other end of said rodless cylinder for applying air pressure against movement of said piston in said second direction, responsive to operation of said second valve.

17. A rodless cylinder rope tensioning apparatus for tensioning at least one rope in a paper-making machine, said apparatus comprising a pair of rodless cylinders, each of said rodless cylinders having a barrel including an internal bore, an operating end and a non-operating end; a piston slidably disposed in said internal bore between said operating end and said non-operating end of said barrel and a yoke sheave rotatably caried by said piston, said yoke sheave slidably disposed with said piston; a double air piloted distributor valve pneumatically connected to said operating end and said non-operating end of said barrel, a flow valve pneumatically connected to said distributor valve and a pressure regulator pneumatically connected to said flow valve; a first push button valve pneumatically connected to said distributor valve and said pressure regulator for selectively opening said distributor valve and facilitating flow of air from said pressure regulator through said flow valve and said distributor valve and into said non-operating end of said barrel; and a second push button valve pneumatically connected to said distributor valve and said pressure regulator for selectively opening said distributor valve and facilitating flow of air from said pressure regulator, through said flow valve and said distributor valve and into said operating end of said barrel, whereby said piston is caused to selectively traverse said internal bore toward said operating end of said barrel for threading the rope on said yoke sheave, responsive to operation of said first push button valve and said piston is caused to selectively traverse said internal bore toward said non-operating end of said barrel for selectively tensioning the rope in low pressure mode, responsive to operation of said second push button valve.

18. A rodless cylinder rope tensioning apparatus for tensioning at least one rope in a paper-making machine, said apparatus comprising at least one rodless cylinder, each of said at least one rodless cylinder having a barrel including an internal bore, an operating end and a non-operating end; a piston slidably disposed in said internal bore between said operating end and said non-operating end of said barrel and a yoke sheave rotatably carried by said piston, said yoke sheave slidably disposed with said piston; a double air piloted distributor valve pneumatically connected to said operating end and said non-operating end of said barrel; an air piloted flow valve having an air entry port pneumatically connected to said distributor valve and a first pressure regulator pneumatically connected to said air piloted flow valve; a first push button valve pneumatically connected to said distributor valve and said first pressure regulator for selectively opening said distributor valve and facilitating flow of air from said first pressure regulator through said air piloted flow valve and said distributor valve and into said non-operating end of said barrel; a second push button valve pneumatically connected to said distributor valve and said first pressure regulator for selectively open said distributor valve and facilitating flow of air from said first pressure regulator, through said air piloted flow valve and said distributor valve and into said operating end of said barrel, whereby said piston is caused to selectively traverse said internal bore toward said operating end of said barrel for threading the rope on said yoke sheave, responsive to operation of said first push button valve and said piston is caused to selectively traverse said internal bore toward said non-operating end of said barrel for selectively tensioning the rope in low pressure mode, responsive to operation of said second push button valve; a lever valve pneumatically connected to said first pressure regulator and said air piloted flow valve for selectively opening said air entry port in said air piloted flow valve and a second pressure regulator pneumatically connected to said air piloted flow valve at said air entry port, for selectively increasing air pressure flowing in said operating end of said barrel and tensioning said yoke sheave in high pressure mode, responsive to operation of said lever valve during said low pressure mode.

19. A rodless cylinder rope tensioning apparatus for tensioning at least one rope in a paper-making machine, said apparatus comprising at least one rodless cylinder, each of said at least one rodless cylinder having a barrel including an internal bore, an operating end and a non-operating end; a piston slidably disposed in said internal bore between said operating end and said non-operating end of said barrel and a yoke sheave rotatably carried by said piston, said yoke sheave slidably disposed with said piston; a double air piloted distributor valve pneumatically connected to said operating end and said non-operating end of said barrel, a flow valve pneumatically connected to said distributor valve and an adjustable pressure regulator pneumatically connected to said flow valve; a first push button valve pneumatically connected to said distributor valve and said adjustable pressure regulator for selectively opening said distributor valve and facilitating flow of air from said adjustable pressure regulator through said flow valve and said distributor valve and into said non-operating end of said barrel; and a second push button valve pneumatically connected to said distributor valve and said adjustable pressure regulator for selectively opening said distributor valve and facilitating flow of air from said adjustable pressure regulator, through said flow valve and said distributor valve and into said operating end of said barrel, whereby said piston is caused to selectively traverse said internal bore toward said operating end of said barrel for threading the rope on said yoke sheave, responsive to operation of said first push button valve and said piston is caused to selectively traverse said internal bore toward said non-operating end of said barrel for selectively tensioning the rope in low pressure mode, responsive to operation of said second push button valve; an air piloted safety valve pneumatically connected to said non-operating end of said barrel and said distributor valve and an adjustable safety regulator pneumatically connected to said air piloted safety valve for delivering air through said air piloted safety valve to said barrel and applying air pressure against movement of said piston in said low pressure mode, responsive to operation of said second push button valve.

20. A rodless cylinder rope tensioning apparatus for tensioning at least one rope in a paper-making machine, said apparatus comprising at least one rodless cylinder, each of said at least one rodless cylinder having a barrel including an internal bore, an operating end and a non-operating end; a piston slidably disposed in said internal bore between said operating end and said non-operating end of said barrel and a yoke sheave rotatably carried by said piston, said yoke sheave slidably disposed with said piston; a double air piloted distributor valve pneumatically connected to said operating end and said non-operating end of said barrel, a flow valve pneumatically connected to said distributor valve and a first pressure regulator pneumatically connected to said flow valve; a first push button valve pneumatically connected to said distributor valve and said first pressure regulator for selectively opening said distributor valve and facilitating flow of air from said first pressure regulator through said flow valve and said distributor valve and into said non-operating end of said barrel; a second push button valve pneumatically connected to said distributor valve and said first pressure regulator for selectively opening said distributor valve and facilitating flow of air from said first pressure regulator, through said flow valve and said distributor valve and into said operating end of said barrel, whereby said piston is caused to selectively traverse said internal bore toward said operating end of said barrel for threading the rope on said yoke sheave, responsive to operation of said first push button valve and said piston is caused to selectively traverse said internal bore toward said non-operating end of said barrel for selectively tensioning the rope in low pressure mode, responsive to operation of said second push button valve; a lever valve pneumatically connected to said first pressure regulator and said air piloted flow valve for selectively opening said air entry port in said air piloted flow valve and a second pressure regulator pneumatically connected to said air piloted flow valve at said air entry port, for selectively increasing air pressure flowing in said operating end of said barrel and tensioning said yoke sheave in "high pressure" mode, responsive to operation of said lever valve during said "low pressure" mode; and an air piloted safety valve pneumatically connected to said non-operating end of said barrel and said distributor valve and a third pressure regulator pneumatically connected to said air piloted safety valve for delivering air to said barrel and applying air pressure against movement of said piston in said "low pressure" mode, responsive to operation of said second push button valve.

* * * * *